United States Patent
Park et al.

(10) Patent No.: US 11,926,315 B2
(45) Date of Patent: Mar. 12, 2024

(54) ELECTRONIC APPARATUS FOR DETECTING RISK FACTORS AROUND VEHICLE AND METHOD FOR CONTROLLING SAME

(71) Applicant: SAMSUNG ELECTRONICS CO., LTD., Suwon-si (KR)

(72) Inventors: Dongwoo Park, Suwon-si (KR); Heejun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 17/283,881

(22) PCT Filed: Dec. 26, 2019

(86) PCT No.: PCT/KR2019/095052
§ 371 (c)(1),
(2) Date: Apr. 8, 2021

(87) PCT Pub. No.: WO2020/139063
PCT Pub. Date: Jul. 2, 2020

(65) Prior Publication Data
US 2021/0347353 A1    Nov. 11, 2021

(30) Foreign Application Priority Data
Dec. 28, 2018 (KR) .......................... 10-2018-0172440

(51) Int. Cl.
*B60W 30/09* (2012.01)
*B60W 30/08* (2012.01)
(Continued)

(52) U.S. Cl.
CPC ............ *B60W 30/09* (2013.01); *B60W 30/08* (2013.01); *B60W 50/14* (2013.01); *G06N 20/00* (2019.01);
(Continued)

(58) Field of Classification Search
CPC ................. B60W 30/08; B60W 50/14; B60W 2050/146; B60W 30/09; B60W 40/112;
(Continued)

(56) References Cited

U.S. PATENT DOCUMENTS 6,204,778 B1    3/2001  Bergan et al.
7,260,460 B2    8/2007  Mattes et al.
(Continued)

FOREIGN PATENT DOCUMENTS

CN    103661366 A        3/2014
CN    107972672 A   *    5/2018   ............... B60Q 9/00
(Continued)

OTHER PUBLICATIONS

Fukuta, Original and Translation of WO 2017104712 A1, Dec. 14, 2016 (Year: 2016).*
(Continued)

*Primary Examiner* — James J Lee
*Assistant Examiner* — Andrew Sang Kim
(74) *Attorney, Agent, or Firm* — Sughrue Mion, PLLC

(57) ABSTRACT

Disclosed is an electronic apparatus for detecting risk factors around a vehicle. The present electronic apparatus comprises a communicator, a memory storing at least one computer-executable instruction, and a processor for executing the at least one computer-executable instruction, wherein the processor receives, through the communicator, an image obtained from a camera located to capture the outside of the vehicle, calculates a rollover index of an external vehicle on the basis of an image of the external vehicle included in the obtained image, and performs a preset operation according to the calculated rollover index.

18 Claims, 11 Drawing Sheets

(51) Int. Cl.
*B60W 50/14* (2020.01)
*G06N 20/00* (2019.01)
*G06V 10/764* (2022.01)
*G06V 10/82* (2022.01)
*G06V 20/58* (2022.01)

(52) U.S. Cl.
CPC ............ *G06V 10/764* (2022.01); *G06V 10/82* (2022.01); *G06V 20/58* (2022.01); *G06V 20/584* (2022.01); *B60W 2050/146* (2013.01)

(58) Field of Classification Search
CPC ... B60W 2420/42; G06N 20/00; G06V 10/82; G06V 20/58; B60R 21/013
See application file for complete search history.

(56) References Cited

U.S. PATENT DOCUMENTS

| | | | |
|---|---|---|---|
| 7,440,844 B2 | 10/2008 | Barta et al. | |
| 8,392,072 B2 | 3/2013 | Le et al. | |
| 8,489,287 B2 | 7/2013 | Hsu et al. | |
| 8,824,741 B2 | 9/2014 | Walter | |
| 9,116,784 B2 | 8/2015 | Yao et al. | |
| 9,187,051 B2 | 11/2015 | Feser et al. | |
| 9,187,094 B2 | 11/2015 | Han | |
| 2011/0043377 A1* | 2/2011 | McGrath | G08G 1/096775 340/905 |
| 2014/0081542 A1 | 3/2014 | Yao et al. | |
| 2015/0151756 A1 | 6/2015 | Han | |
| 2015/0323648 A1* | 11/2015 | Haglund | G06T 7/80 701/4 |
| 2017/0060234 A1* | 3/2017 | Sung | G06F 3/038 |
| 2017/0305374 A1 | 10/2017 | Hong et al. | |
| 2018/0061253 A1 | 3/2018 | Hyun | |
| 2018/0201148 A1* | 7/2018 | Donnelly | G05D 1/0088 |
| 2019/0279293 A1* | 9/2019 | Tang | G06N 3/084 |
| 2020/0202144 A1* | 6/2020 | Porter | G06V 20/58 |

FOREIGN PATENT DOCUMENTS

| | | | | |
|---|---|---|---|---|
| CN | 107972672 A | | 5/2018 | |
| KR | 100640175 B1 | * | 11/2006 | ............ B60T 8/245 |
| KR | 10-2009-0010439 A | | 1/2009 | |
| KR | 10-2015-0062490 A | | 6/2015 | |
| KR | 20160140303 A | * | 12/2016 | ............ B60W 40/02 |
| KR | 1020160140303 A | | 12/2016 | |
| KR | 1020180025587 A | | 3/2018 | |
| KR | 1020180112336 A | | 10/2018 | |

OTHER PUBLICATIONS

Espacenet English translation of CN107972672A description (Year: 2018).*
International Search Report (PCT/ISA/210) dated Apr. 14, 2020 issued by the International Searching Authority in International Application No. PCT/KR2019/095052.
Written Opinion (PCT/ISA/237) dated Apr. 14, 2020 issued by the International Searching Authority in International Application No. PCT/KR2019/095052.
Communication dated Oct. 5, 2021 by the European Patent Office in European Application No. 19903942.1.
Communication dated Oct. 25, 2022 by the Korean Intellectual Property Office in Korean Patent Application No. 10-2018-0172440.
CN Communication dated May 31, 2023 from the Chinese Patent Office in CN Patent Application No. 201980081522.X.
EP Communication dated Jun. 9, 2023 from the European Patent Office in EP Patent Application No. 19903942.1.
Communication dated Jan. 21, 2024, issued by the State Intellectual Property Office of P.R. China in Chinese Application No. 201980081522.X.

* cited by examiner

ELECTRONIC APPARATUS FOR DETECTING RISK FACTORS AROUND VEHICLE AND METHOD FOR CONTROLLING SAME

TECHNICAL FIELD

The disclosure relates to an electronic apparatus for detecting risk factors around a vehicle and a method for controlling the same. More particularly, the disclosure relates to an electronic apparatus for calculating a rollover index of an external vehicle based on an image obtained through a camera mounted on the vehicle, and a method for controlling the same.

BACKGROUND ART

Generally, when a vehicle is rolled over, property damage as well as personal damage is enormous. Roll refers to a behavior of the vehicle in a width direction, and rollover refers to the vehicle moving sideways or overturning. The overturning of the vehicle generally occurs when the vehicle's center of gravity moves outward with respect to a turning direction when the vehicle turns, thereby causing the wheels inside the turn to fall off the ground.

Conventionally, in order to prevent the vehicle from overturning, a method such as providing an appropriate warning to a driver of the vehicle in a situation predicted to be overturned has been used. A risk of overturning was detectable by various sensors provided in the vehicle.

However, the overturning of a vehicle is extremely damaging not only to the overturned vehicle, but also to the other vehicles around the vehicle. Therefore, it is necessary to detect the risk of overturning not only the vehicle but also external vehicles.

DETAILED DESCRIPTION OF THE INVENTION

Technical Problem

The disclosure is in accordance with the above-described necessity, and an object of the disclosure is to provide an electronic apparatus for calculating risk factors around a vehicle, especially a rollover index of external vehicles in the vicinity of the vehicle based on images obtained through a camera mounted on the vehicle, and a method for controlling thereof.

More particularly, the disclosure is to provide an electronic apparatus for calculating a rollover index of vehicles located in front, rear, or side of a driving vehicle from an image obtained from the camera mounted on the driving vehicle, determining a rollover possibility of the vehicle according to the rollover index, and establishing a driving strategy of the vehicle in consideration of a vehicle having the rollover possibility to control the vehicle according to the established driving strategy, and a method for controlling thereof.

Technical Solution

According to an embodiment of the disclosure, an electronic apparatus for detecting risk factors around a vehicle, the apparatus includes a communicator, a memory configured to store at least one computer-executable instruction, and a processor configured to execute the at least one computer-executable instruction, wherein the processor is configured to receive, through the communicator, an image obtained from a camera located to (disposed for) capture the outside of the vehicle, calculate, based on an image of an external vehicle included in the obtained image, a rollover index of the external vehicle, and perform a preset operation according to the calculated rollover index.

The processor may be configured to, based on a plurality of external vehicles being included in the obtained image, identify an external vehicle whose total height is equal to or greater than a preset height among the plurality of external vehicles, and preferentially calculate a rollover risk index of the identified external vehicle.

The processor may be configured to obtain information on a type of the plurality of external vehicles by inputting an image of the plurality of external vehicles to a first artificial intelligence model learned by an artificial intelligence algorithm, and identify the external vehicle whose total height is equal to or greater than the preset height among the plurality of external vehicles based on the obtained information.

The processor may be configured to, based on the plurality of external vehicles being included in the obtained image, identify an external vehicle on a road having a curvature greater than a preset curvature among the plurality of external vehicles, and preferentially calculate a rollover index of the identified external vehicle.

The processor may be configured to obtain map information of where the vehicle is currently located, and identify the external vehicle on a road having a curvature greater than the preset curvature among the plurality of external vehicles based on the obtained map information.

The processor may be configured to obtain a roll angle of the external vehicle by inputting the image of the external vehicle to a second artificial intelligence model learned by the artificial intelligence algorithm, and calculate a rollover index of the external vehicle based on the obtained roll angle.

The processor may be configured to obtain information on the type of the external vehicle by inputting the image of the external vehicle to the first artificial intelligence model learned by the artificial intelligence algorithm, obtain a plurality of characteristic parameters with respect to the external vehicle based on the information on the type of the external vehicles, and calculate a rollover index of the external vehicle based on the plurality of characteristic parameters.

The plurality of characteristic parameters with respect to the external vehicle may be configured to include mass, roll damping coefficient, roll elasticity coefficient, and track of the external vehicle.

The processor may be configured to, based on the calculated rollover index being greater than a preset rollover index, provide a notification to a user.

The processor may be configured to, based on no preset user action within a preset time after providing the notification being identified, control the vehicle to avoid from the external vehicle.

According to an embodiment of the disclosure, a method for controlling an electronic apparatus for detecting risk factors around a vehicle, the method includes receiving an image obtained from a camera located to capture the outside of the vehicle, calculating, based on an image of an external vehicle included in the obtained image, a rollover index of the external vehicle, and performing a preset operation according to the calculated rollover index.

The calculating the rollover index may include, based on a plurality of external vehicles being included in the obtained image, identifying an external vehicle whose total height is equal to or greater than a preset height among the plurality of external vehicles, and preferentially calculating a rollover risk index of the identified external vehicle.

The identifying may include obtaining information on a type of the plurality of external vehicles by inputting an image of the plurality of external vehicles to a first artificial intelligence model learned by an artificial intelligence algorithm, and identifying the external vehicle whose total height is equal to or greater than the preset height among the plurality of external vehicles based on the obtained information.

The calculating the rollover index may include, based on the plurality of external vehicles being included in the obtained image, identifying an external vehicle on a road having a curvature greater than a preset curvature among the plurality of external vehicles, and preferentially calculating a rollover index of the identified external vehicle.

The identifying may include obtaining map information of where the vehicle is currently located, and identifying the external vehicle on a road having a curvature greater than the preset curvature among the plurality of external vehicles based on the obtained map information.

The calculating the rollover index may include obtaining a roll angle of the external vehicle by inputting the image of the external vehicle to a second artificial intelligence model learned by the artificial intelligence algorithm, and calculating a rollover index of the external vehicle based on the obtained roll angle.

The calculating the rollover index may include obtaining information on the type of the external vehicle by inputting the image of the external vehicle to the first artificial intelligence model learned by the artificial intelligence algorithm, obtaining a plurality of characteristic parameters with respect to the external vehicle based on the information on the type of the external vehicles, and calculating a rollover index of the external vehicle based on the plurality of characteristic parameters.

The plurality of characteristic parameters with respect to the external vehicle may be configured to include mass, roll damping coefficient, roll elasticity coefficient, and track of the external vehicle.

The performing the preset operation may include, based on the calculated rollover index being greater than a preset rollover index, providing a notification to a user.

The performing the preset operation may include, based on no preset user action within a preset time after providing the notification being identified, controlling the vehicle to avoid from the external vehicle.

BEST MODE FOR IMPLEMENTING THE DISCLOSURE

Figure 1:
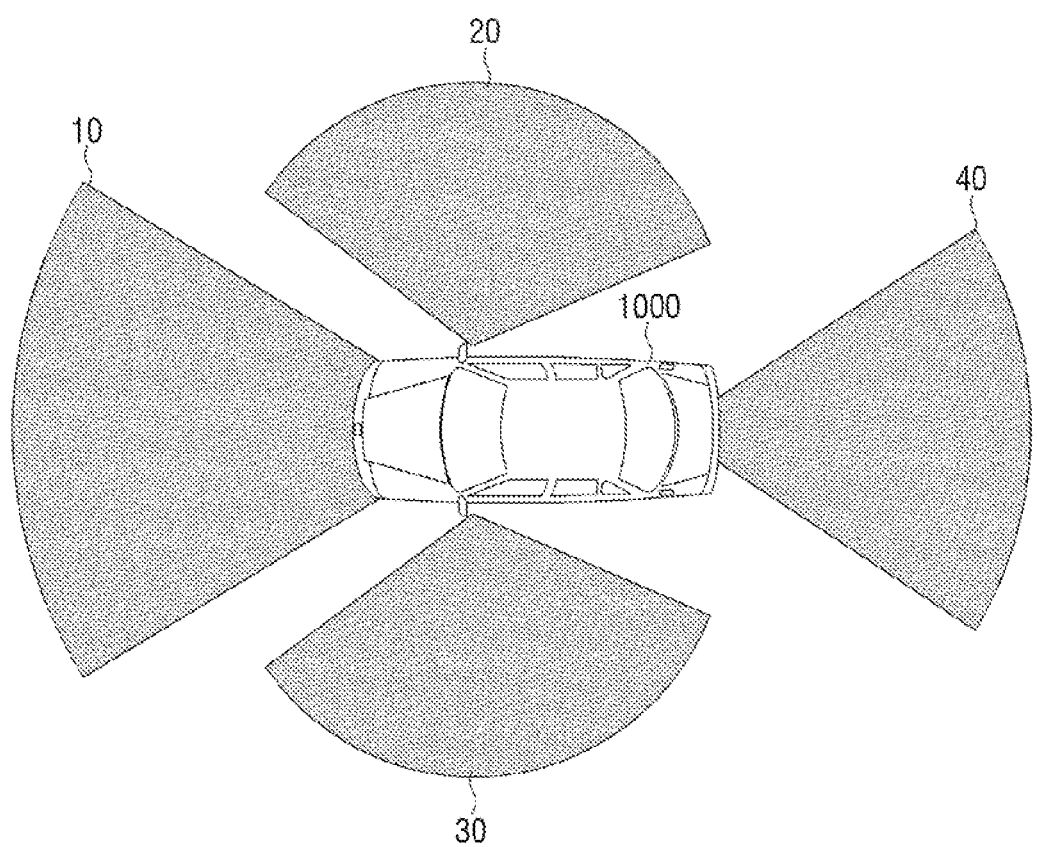
FIG. 1 is a view illustrating a vehicle according to an embodiment.

The above and other aspects, features, and advantages of certain embodiments of the present disclosure will be more apparent from the following description taken in conjunction with the accompanying drawings, in which: However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

The terms "have", "may have", "include", and "may include" used in the exemplary embodiments of the present disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

In the exemplary embodiment of the present disclosure, the term "module," "unit," or "part" is referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor (not shown).

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element (e.g., a third element) may not be existed between the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, a phrase "a sub-processor configured to (set to) perform A, B, and C" may refer to a generic-purpose processor (e.g., CPU or application processor) capable of performing corresponding operations by executing a dedicated processor (e.g., embedded processor) for performing corresponding operation, or executing one or more software programs stored in a memory device.

The terms used in the description are used to merely describe a specific embodiment, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the present disclosure belongs. The terms that are used in the present disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the present disclosure should not be interpreted as excluding the embodiments of the present disclosure.

The vehicle described in the disclosure may be, for example, a car, a truck, a motorcycle, a bus, or the like. The vehicle described in the disclosure may include all of an internal combustion engine vehicle including an engine as a power source, a hybrid vehicle including an engine and an electric motor as a power source, an electric vehicle including an electric motor as a power source, or the like. The vehicle may be an autonomous vehicle or an unmanned vehicle (driverless car) that can operate by itself by recognizing circumstances of driving and controlling the vehicle without a driver's manipulation. Alternatively, the vehicle may be a manually operated vehicle that is driven by driver's manipulation, or a vehicle in which a manual manipulation and autonomous driving method are combined.

In the disclosure, a rollover index is used as an index capable of identifying a rollover risk of a driving vehicle. The rollover index may be calculated using vehicle-specific characteristic parameter values and rate of change in vehicle roll angle and roll direction angle FIG. 1 is a view illustrating an exterior of a vehicle 1000 according to an embodiment of the disclosure.

At least one camera may be disposed in at least one of the front, side and rear of the vehicle 1000. The front camera may be arranged to capture the front 10 of the vehicle 1000, the side camera may be arranged to capture sides 20 and 30 of the vehicle 1000, and the rear camera may be arranged to capture the rear 10 of the vehicle 1000.

Based on an image obtained through the camera provided in the vehicle 1000 as described above, the vehicle 1000 may calculate a rollover index of vehicles located in front, rear, or side of the vehicle 1000, identify whether or not there is a rollover risk by comparing the rollover index with a preset rollover index, establish a driving strategy of a vehicle in consideration of a rollover risk, and control the vehicle to drive according to the established driving strategy.

Figure 2:
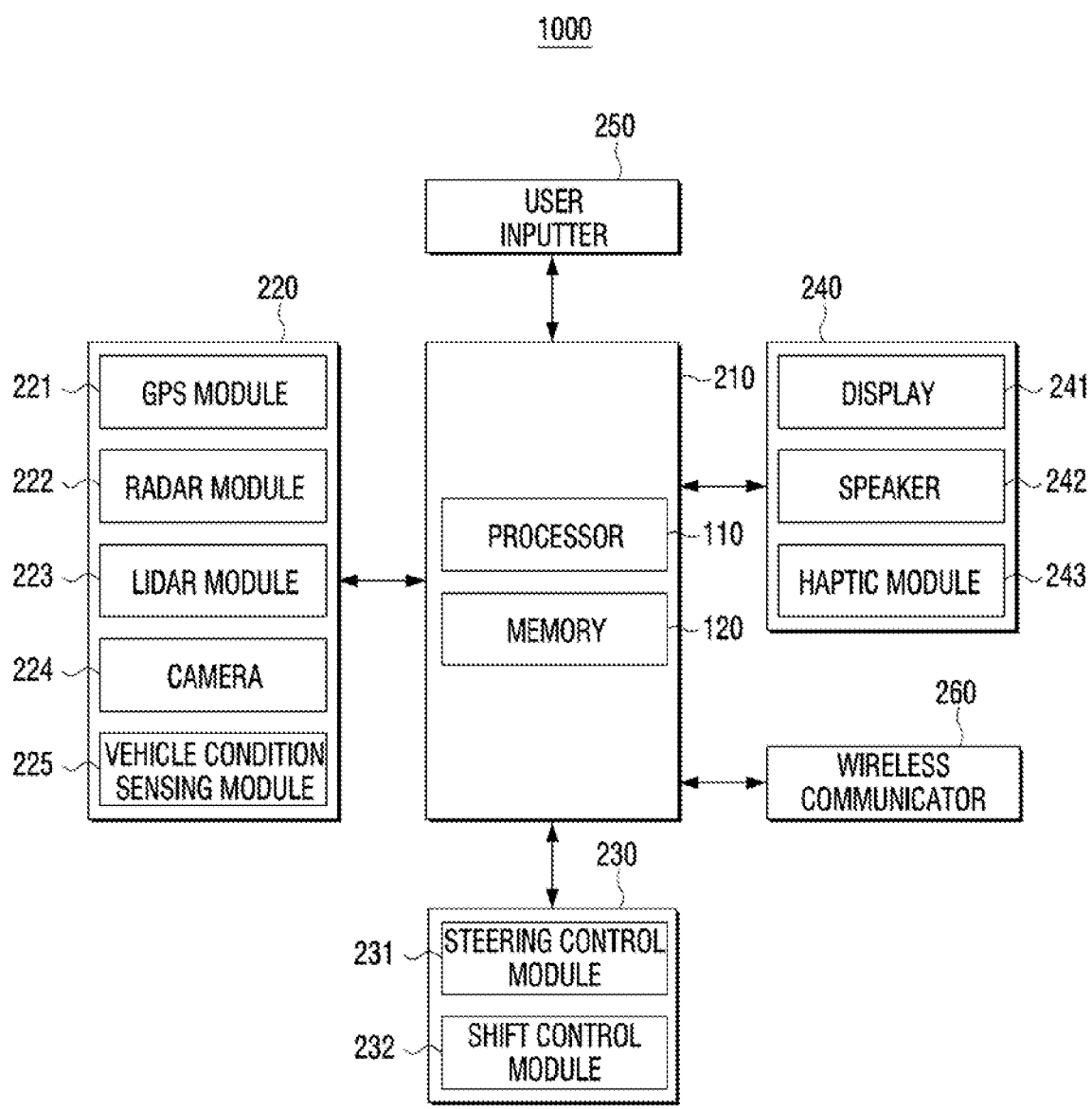
FIG. 2 is a block diagram illustrating a configuration of a vehicle according to an embodiment.

Hereinafter, a configuration of the vehicle 1000 will be described in detail with reference to FIG. 2. FIG. 2 is a block diagram illustrating the configuration of the vehicle 1000 according to an embodiment of the disclosure.

According to an embodiment, the vehicle 1000 may include a computing device 210, a sensor 220, a vehicle driver 230, an outputter 240, a user inputter 250, and a wireless communicator 260. The vehicle 1000 may not include some of the configurations illustrated in FIG. 2, or further include other components that are not illustrated therein.

The computing device 210 may include a processor 110 and a memory 120. The memory 120 may include an internal memory or an external memory. The memory 120 may be accessed by the processor 110, and perform readout, recording, correction, deletion, update, and the like, on data by the controller 110. The memory 120 may include instructions executable by the processor 110.

The processor 110 may control a plurality of components included in the vehicle 1000 and may perform various data processing and operations. The processor 110 may perform various functions by executing instructions stored in the memory 120. The processor 110 may be a central processing unit (CPU) or a graphics-processing unit (GPU), or both. The processor 110 may be implemented with at least one general processor, a digital signal processor, an application specific integrated circuit (ASIC), a system on chip (SoC), a microcomputer (MICOM), or the like.

The sensor 220 is a component for acquiring various information related to the vehicle 1000. The sensor 220 may include, for example, a GPS module 221, a radio detection and ranging (RADAR) module 222, a light detection and ranging (LIDAR) module 223, and a camera 224, and a vehicle condition sensing module 225 as shown in FIG. 2.

The GPS module 221 includes a circuitry for obtaining information on a location of the vehicle 1000. The processor 110 may obtain information on the location of the vehicle 1000 based on a signal transmitted from a GPS satellite using the GPS module 221.

The radar module 222 includes a circuitry for transmitting radio waves and receiving radio waves reflected from objects (e.g., external vehicles, street trees, street lights, traffic lights, traffic signs, etc.). The processor 110 may obtain information on a distance and a relative speed between the vehicle 1000 and objects based on the received radio wave.

The Lidar module 223 includes circuitry for transmitting light and receiving light reflected from objects. The processor 110 may obtain information on the distance and the relative speed between the vehicle 1000 and the object based on the received light.

The camera 224 is a component for capturing an environment around the vehicle 1000. The camera 224 may include, for example, at least one of a front camera, a rear camera, and a side camera.

The front camera may be arranged to capture the front of the vehicle 1000. The front camera may be a stereo camera including two lenses, and may be implemented as a mono camera with one lens.

The side camera may be arranged to capture the side of the vehicle 1000. The side camera may be disposed on the left side and/or the right side of the vehicle 1000. The side camera may also be implemented as a stereo camera or a mono camera.

The rear camera may be arranged to capture the rear of the vehicle 1000. The rear camera may also be implemented as a stereo camera or a mono camera.

The processor 110 may identify a relative speed of the vehicle 1000 and the object included in the image obtained through the camera 224, and a distance between the object and the vehicle 1000.

According to an embodiment, the processor 110 may obtain a depth map from an image obtained through the camera 224 implemented as a stereo camera through a stereo matching technique. Based on the depth map, a distance to the object, a relative speed to the object, and a distance between a plurality of objects may be identified.

According to another embodiment, the processor 110 may identify a relative speed based on a distance to an object and a change in the size of the object based on the size of the object in the image obtained through the camera 224 implemented as a mono camera. For example, the processor 110 may identify a distance to the object with an image obtained through the mono camera using an artificial intelligence model that has learned a relationship between the object size and the distance to the object in an image. The artificial intelligence model may be generated by learning a relationship between the size of an object in an image and a distance to an object identified through the Radar module 222 or the Lidar module 223.

The vehicle condition sensing module 225 is a component for sensing various situations of the vehicle 1000. The vehicle condition sensing module 225 may include a speed sensor for measuring the speed of the vehicle 1000, a yaw sensor for measuring a yaw rate (rotation angular speed) of the vehicle 1000, and a yaw sensor for measuring the angular speed of the vehicle. a gyro sensor, a temperature sensor, a humidity sensor, or the like. In addition, various sensors may be included.

The vehicle driver 230 may control various configurations related to the operation of the vehicle 1000.

The vehicle driver 230 may include a steering control module 231 and a shift control module 232.

The steering control module 231 may perform control for changing the direction of the steering wheel of the vehicle 1000. The steering wheel is a wheel whose direction is changed according to a steering input, and the steering wheel may be changed to the left or right direction according to the user's steering input by the steering wheel. Even without the user's manual manipulation through the steering wheel, the processor 110 may control the steering control module 231 to change the direction of the steering wheel in a specific situation. For example, the processor 110 may control the steering control module 231 to change the direction of the steering wheel in a situation where a risk of overturning an external vehicle is detected.

The shift control module 232 may control the speed of the vehicle 1000. The shift control module may control the vehicle 1000 to accelerate or decelerate. According to the manual method, the user may control the speed of the vehicle 1000 by stepping on an accelerator pedal or a brake pedal. Even without such manual user manipulation, the processor 110 may control the shift control module 232 in a specific situation to decelerate or accelerate a speed of the vehicle 1000. For example, the processor 110 may control the shift control module 232 such that the vehicle 1000 accelerates or decelerates in a situation where a risk of overturning of an external vehicle is detected.

As such, the processor 110 may control at least one of the steering control module 231 and the shift control module 232 when there is a risk of overturning in the external vehicle such that the vehicle 1000 avoids the external vehicle that has a possibility of overturning.

The outputter 240 may include a display 241, a speaker 242, and a haptic module 243.

The display 241 is a component for displaying an image, and may include a liquid crystal display (LCD) or an organic light emitting diode (OLED). According to an embodiment, the display 241 may be implemented as a head up display (HUD). If the display 241 is implemented as a HUD, a windshield of the vehicle 1000 may output information through a transparent display provided in the windshield.

The speaker 242 is a component for outputting sound. The haptic module 243 includes a circuit for generating a tactile output. For example, the haptic module may vibrate steering wheel, seat belt, and seat of the vehicle 1000.

When there is a risk of overturning in the external vehicle, the processor 110 may control the outputter 240 to notify the user of the danger situation. For example, the processor 110 may control the display 241 to display information notifying the danger situation when there is a risk of overturning in the external vehicle. As another example, the processor 110 may control the speaker 242 to output a warning sound when there is a risk of overturning in the external vehicle. As another example, the processor 110 may control the haptic module 243 to vibrate at least one of a steering wheel, a seat belt, and a seat of the vehicle 1000 when there is a risk of overturning in the external vehicle.

The user inputter 250 is a component for receiving a user input, and may include an input device such as a button or a touch panel. According to an embodiment, the vehicle 1000 may include a touch screen in which a touch panel and a display 241 are combined.

The processor 110 may control a function of the vehicle 1000 based on a user input received through the user inputter.

The wireless communicator 260 is a component for performing communication with an external device. The wireless communicator 260 may be composed of Bluetooth, communication protocols described in IEEE 802.11 (including IEEE 802.11 revisions), cellular technology (e.g., GSM, CDMA, UMTS, EV-DO, WiMAX, or LTE), ZigBee, dedicated short range communications (DSRC), and radio frequency identification (RFID) communications.

For example, while the vehicle 1000 is driving, the wireless communicator 260 may connect to an external vehicle, various servers, systems, etc. existing around the vehicle 1000 in real time to exchange data.

By performing communication with various external devices through the wireless communicator 260, the vehicle 1000 may implement vehicle to everything (V2X). The V2X is concept collectively referring to communication technology for information exchange, such as vehicle and vehicle (V2V), vehicle and infrastructure base station (V2I), vehicle and pedestrian (V2P), vehicle and network (V2N), vehicle to cloud (V2C), or the like.

The processor 110 may receive an image obtained through the camera 224 arranged to capture the outside of the vehicle 1000 through the communicator 130 by executing a computer executable command stored in the memory 120, and based on the image of the external vehicle included in the obtained image, calculate a rollover index of the external vehicle to perform a preset operation according to the calculated rollover index.

Here, the preset operation is an operation of controlling the display 241 to display information for notifying danger, an operation of controlling the speaker 242 to output a danger notification sound, and an operation of controlling the display 241 to display information on a driving strategy established by the driving strategy of the vehicle 1000, and an operation of controlling the vehicle driver 230 according to an established driving strategy.

A method of calculating the rollover index by the processor 110 will be described in more detail below.

Components of the vehicle 1000 may communicate with each other through a system bus, a network, or other communication method.

Meanwhile, it has been described as the configurations of the vehicle 1000 are integrated in the vehicle 1000, but some components may be detachably mounted on the vehicle 1000 or may be connected to the vehicle 1000 through a wired or wireless connection method.

Figure 3:
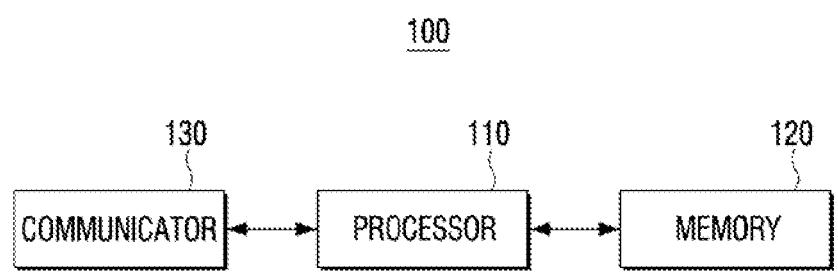
FIG. 3 is a block diagram illustrating a configuration of an electronic apparatus according to an embodiment.

FIG. 3 is a view illustrating an electronic apparatus 100 according to an embodiment of the disclosure.

The electronic apparatus 100 may include the computing device 210 described above. In other words, the electronic apparatus 100 may include the processor 110 and the memory 120 and may include the communicator 130.

According to an embodiment, the electronic apparatus 100 may be implemented as a separate device from the vehicle 1000 and connected to components of the vehicle 1000 through the communicator 130 in a wired or wireless communication. For example, the electronic apparatus 100 may be implemented as a smartphone, a tablet personal computer, a wearable device, or the like.

According to an embodiment, the communicator 130 may perform short-range communication. Examples of short-range communication include Bluetooth™, radio frequency identification (RFID), infrared data association (IrDA), ultra-wideband (UWB), ZigBee, near field communication (NFC), and wireless-fidelity (Wi-Fi), Wi-Fi Direct, and wireless universal serial bus (USB) technology.

Figure 4:
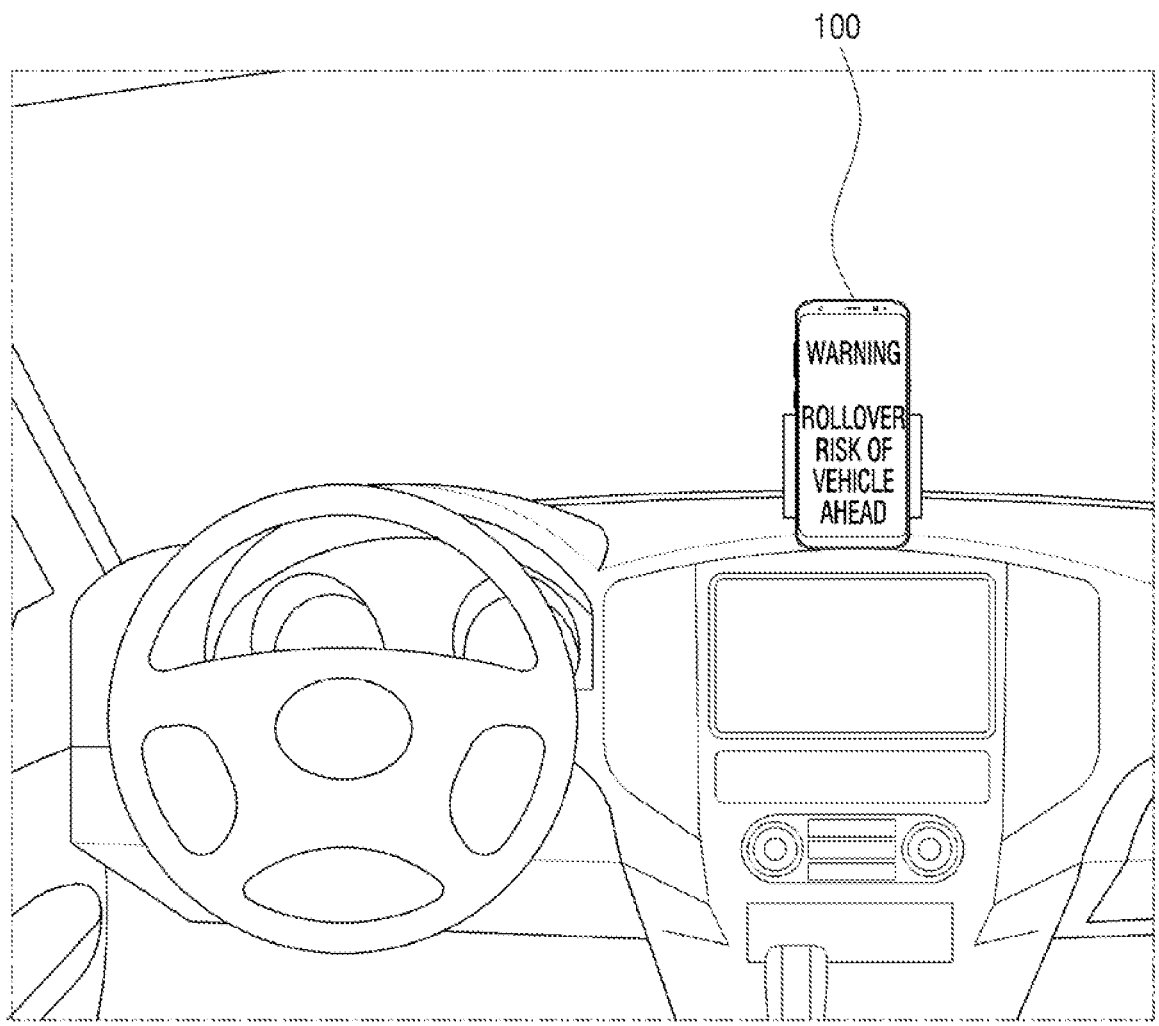
FIG. 4 is a view illustrating an electronic apparatus according to an embodiment implemented as a smartphone.

FIG. 4 is an example in which the electronic apparatus 100 is implemented as a device separate from a vehicle, and illustrates a case in which the electronic apparatus 100 is implemented as a smartphone. For example, when the user gets on the vehicle 1000 with the electronic apparatus 100 implemented as a smartphone, the electronic apparatus 100 may be automatically or directly communicated with the vehicle 1000 in a short range communication method by executing an application by the user.

According to another embodiment, the electronic apparatus 100 may be implemented as a device included in the vehicle 1000. In this case, the communicator 130 may communicate with components of the vehicle 1000 through a vehicle communication network. The vehicle communication network may adopt a communication protocol such as media oriented systems transport (MOST), FlexRay, controller area network (CAN), local interconnect network (LIN), or the like.

According to another embodiment, the communicator 130 may communicate with an external device. According to an embodiment, the communicator 130 may communicate with an external device according to wireless Internet technology. Examples of wireless Internet technologies may include Wireless LAN (WLAN), Wireless-Fidelity (Wi-Fi), Wireless Fidelity (Wi-Fi) Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like. For example, the electronic apparatus 100 may exchange data with an external server through wireless Internet. As an example of data to be exchanged, there may be weather information, road traffic condition information (e.g., transport protocol expert group (TPEG)) information, map information, or the like. According to an embodiment, the communicator 130 may be a wireless communicator 260 described above.

The processor 110 may control the overall operation of the electronic apparatus 100.

According to an embodiment, the processor 110 may execute a computer executable command stored in the memory 120, receive an image obtained through the camera 224 arranged to capture the outside of the vehicle 1000 through the communicator 130, based on the image of the external vehicle included in the obtained image, calculate a rollover index of the external vehicle, and perform a preset operation according to the calculated rollover index.

The preset operation may include at least one of the operation of controlling the display 241 to display information for notifying danger, the operation of controlling the speaker 242 to output a danger notification sound, an operation of controlling the display 241 to display information on an established driving strategy by establishing the driving strategy of the vehicle, and an operation of controlling the vehicle driver 230 according to an established driving strategy.

A method of calculating the rollover index of the external vehicle included in the image will be described in detail below.

In order to calculate the rollover index of the vehicle included in the image, the processor 110 may identify the object included in the image using an image segmentation algorithm that distinguishes the object from the background in the image. Here, the object may include not only a vehicle, but also various objects such as signs, separators, or the like.

In addition, the processor 110 may classify a vehicle among the identified objects. Specifically, the vehicle may be classified using a learned artificial intelligence model to classify the vehicle. The learned artificial intelligence model may be used to classify that it is simply a vehicle or even a type of vehicle (Sedan, SUV, bus, etc.). Such a model may learn using images of various types of vehicles as learning data. A specific model name of vehicles may be obtained by classifying a specific vehicle.

In addition, the processor 110 may retrieve the classified vehicle specifications from a publicly disclosed database and obtain characteristic parameter values of the vehicle. The characteristic parameter values may include, for example, a vehicle mass, a roll damping coefficient, a roll elastic coefficient, and a wheel track. The characteristic parameter values will be described in more detail below, but are used to calculate the rollover index.

If a specific model name of the vehicle is obtained using an artificial intelligence model, the characteristic parameter values may be obtained using the specifications of the vehicle with the corresponding model name, and if only the vehicle type is classified, the rollover index may be calculated from the values of characteristic parameter values of the corresponding type.

In addition, the processor 110 may select a vehicle for which the rollover index is to be calculated from among the classified vehicles. Although it is possible to calculate the rollover index for all the classified vehicles, the processor 110 may preferentially calculate a rollover index with respect to external vehicles predicted to be rolled over to reduce the risk of false detection and focused on securing safety of the vehicle 1000.

According to an embodiment, the processor 110 may set region of interest (ROI) on external vehicles (external vehicles within a preset distance) and external vehicles that are expected to be rolled over, and preferentially calculate a rollover index of external vehicles in which the ROI is set. In addition, the processor 110 may continuously track the external vehicles for which the ROI is set while they are within the preset distance with the vehicle 1000 and calculate a rollover index.

The processor 110 may identify relative location of external vehicles through an image obtained through the camera 224 or other methods such as the Radar module 222 and the Lidar module 223. Since a range that the camera 224 can capture is very wide, numerous vehicles are often classified. Among them, the processor 110 may set ROI on external vehicles within a preset distance from the vehicle 1000.

Figure 5:
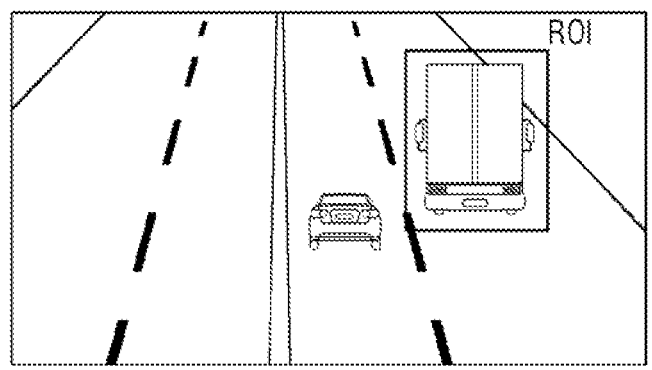
FIGS. 5 to 6 are views illustrating various embodiments of the disclosure in which a region of interest (ROI) is set for a vehicle having a high risk of rollover in an image obtained through a camera.

The rollover of a vehicle is caused by lateral acceleration that occurs during circular motion. In general, even if the vehicle is subjected to the same lateral acceleration, if the center of gravity of the vehicle is high, there is a high possibility of overturning in vehicle dynamics. Therefore, when the image obtained through the camera 224 includes a plurality of external vehicles, the processor 110 may classify the type of each external vehicle, and identify vehicles having a height is higher than a preset height (e.g., commercial vehicles, SUV, etc.) and set the ROI on the identified external vehicles. FIG. 5 is a view illustrating an image obtained through a camera mounted on a driving vehicle, and is a view illustrating an example in which an ROI is set in an external vehicle having a high height.

According to an embodiment, when a plurality of external vehicles are included in an image, the processor 110 may input images of the plurality of external vehicles to an artificial intelligence model learned by an artificial intelligence algorithm to obtain information on the plurality of external vehicles, and based on the obtained information, identify an external vehicle having an overall height equal to or greater than a preset height among the plurality of external vehicles.

The processor 110 may download and use the artificial intelligence model from an external server through the communicator 130. According to another embodiment, the processor 110 may transmit an image obtained through the camera 224 to an external server having the artificial intelligence model, and receive information on the type of vehicle in the image from the external server, a height overall, or the like.

Figure 6:
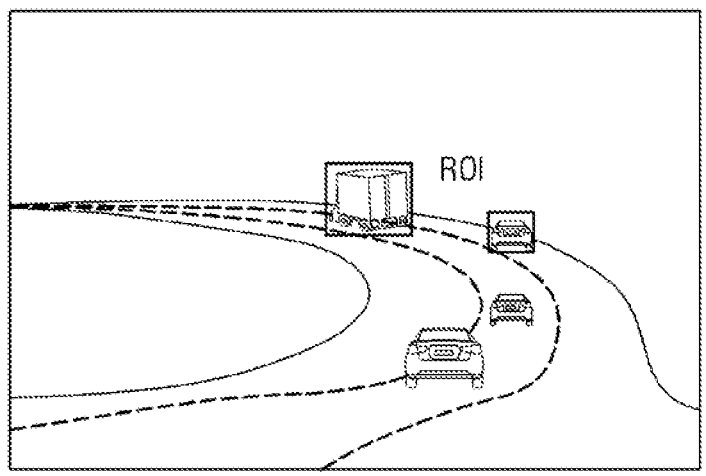

In addition, the processor 110 may preferentially calculate a rollover index for vehicles in the corresponding area when an area with severe curvature or a place of frequent accidents is expected. Since a lateral acceleration due to a circular motion is proportional to a severity of the curvature, the processor 110 may set ROI on vehicles on a road with a severe curvature (a road with a curvature greater than a preset curvature). In the case of the place of frequent accidents, it may be a road with severe curvature or a road requiring relatively rapid handling quality due to a characteristic of the road. Therefore, since a probability of a rollover accident is relatively high, the processor 110 may set the ROI for vehicles in the place of frequent accidents. FIG. 6 is a view illustrating an image obtained through a camera mounted on a vehicle being driven, and is a view illustrating an example of setting the ROI for external vehicles on a road with severe curvature.

According to an embodiment, when a plurality of external vehicles are included in the obtained image, the processor 110 may identify an external vehicle on the road having a curvature greater than a preset curvature among the plurality of external vehicles, and calculate the vehicle's rollover index preferentially.

The processor 110 may identify whether or not the curvature is severe through the road image obtained through the camera 224 or may identify based on map information including curvature information. According to an embodiment, the processor 110 may receive map information from an external server through the communicator 130. In addition, the processor 110 may also receive information such as whether or not an accident occurs through the communicator 130 from an external server. The processor 110 may acquire information such as whether or not there are frequent accidents through the V2X technology. The processor 110 may identify whether external vehicles in the image are on a road with severe curvature or a place of frequent accidents based on information obtained from the outside as described above.

According to an embodiment, the processor 110 may identify a current location of the vehicle 1000 using the GPS module 221 and may obtain map information of a location where the vehicle 1000 is currently located. Further, the processor 110 may identify an external vehicle on a road having a curvature greater than the preset curvature among the plurality of external vehicles in the image, based on the obtained map information.

As described above, the processor 110 may select a vehicle for which a rollover index is to be calculated, and calculate a rollover index for the vehicle.

There are several ways to calculate the rollover index. For example, a risk of overturning may be determined by a ratio of left and right loads of the vehicle as follows.

$$LTR(LoadTransferRatio) = RI(RolloverIndex) = \frac{F_{zR} - F_{zL}}{F_{zL} + F_{zR}} \quad (1)$$

$F_{zR}$: vertical load on the right side of the vehicle
$F_{zL}$: vertical load on the left side of the vehicle If the rollover index is calculated as above, a value between −1 and +1 may be obtained, and 0 is the safest state when a load distribution of the left and right is the same, and −1 or +1 is the case that the load is completely directed to one side, and it may be identified that overturn occurs. In order to accurately calculate the rollover index, it is necessary to directly measure the left and right load distribution, but when considering the cost and ease of installation of the load distribution sensor, direct measurement is relatively difficult. Therefore, it is possible to calculate the rollover index in a different way by developing the equation as follows.

$$RI = \frac{2h}{d}\left(\frac{a_y}{g} + \sin\phi\right) \quad (2)$$

h: Height from the vehicle's roll center (generally near the vehicle's axle) to the vehicle's center of gravity
d: Tread (distance between wheels)
$a_y$: Lateral linear acceleration (generally centripetal acceleration, generally the vehicle's traveling direction is x-axis, the left direction is y-axis)
g: Gravity acceleration (generally 9.801 m/s$^2$)
$\phi$: Roll angle of vehicle In the case of Equation (2) above, a measured value of $a_y$ is required. In the case of $a_y$, it is generally possible to measure an expensive sensor in addition to the vehicle, but it is possible to measure without a sensor using Equation (3) below. If there is a bank angle on a road, it is reflected in the lateral acceleration as shown in Equation (3) below, and the rollover index (RI) may be calculated by taking this into account.

The bank angle may be determined in several ways. For example, based on map information and information obtained through the GPS module 221, the processor 110 may identify an exact location of the vehicle 1000, such as a distance between the vehicle 1000 and an external vehicle, relative speed, or the like. An exact location of the external vehicle may be identified using a relative measurement value, and the bank angle may be calculated by applying this to the map information.

$$a_y = V_y + \gamma v_x - g \sin(\phi_{bank}) \quad (3)$$

$v_y$: lateral linear velocity $v_x$: longitudinal linear velocity (typically a speed of vehicle in driving straight)

$\gamma$: Yaw rate (speed at which a vehicle rotates)

$\phi_{break}$: Degree of inclination in a roll direction of a road

If dynamic parameters (characteristic parameters) of an external vehicle are classified as a type or class of the vehicle (e.g., Sedan, SUV, bus, truck, etc.) based on an image obtained through the camera, average parameters of the corresponding type may be referred. In addition, the rollover index may be developed as follows.

$$RI = \frac{2(C_\Phi + K_\Phi \Phi)}{mgd} \quad (4)$$

$C_y$: Roll damping coefficient when a vehicle's roll motion is simply regarded as a model of simple mass, spring, and damper (the higher it is the higher resistance against a speed in a roll direction is)

$K_y$: Roll elastic modulus when a vehicle's roll motion is simply regarded as a simple mass, spring, and damper model (the higher it is the higher resistance against a change in a roll direction)

$\Phi$: Change rate of vehicle's roll direction angle m: a mass of the vehicle

In the case of using Equation (4), the rollover index may be calculated if only the vehicle's roll angle (Roll Angle, $\phi$), and the rate of change of the vehicle's roll direction angle ($\Phi$) are known.

The processor 110 may obtain a rate of change of the roll angle of the external vehicle and the roll direction angle of the vehicle based on the image obtained through the camera 224. According to an embodiment, an artificial intelligence model learned by an artificial intelligence algorithm may be used.

Specifically, the processor 110 may obtain a rate of change of the roll angle and the roll direction angle of the external vehicle by inputting the image of the external vehicle to the artificial intelligence model learned by the artificial intelligence algorithm. For example, an artificial intelligence model that learns the roll angle of the vehicle with respect to the image obtained by capturing the vehicle using deep learning, and the processor 110 may use the artificial intelligence model learned as described above, a rate of change of the roll angle and the roll direction angle of the included external vehicle may be obtained.

In addition, the processor 110 may predict a rollover index after a short period of time using Equation (4). This will be described in detail below.

Assuming that the current physical state (speed in the direction of the roll, etc.) is maintained for a short period of time, any physical state after a short period of time may be predicted through the Taylor Series. If Equation (4) is used, the predicted rollover index (PRI) may be calculated through the following mathematical development. In general, the calculation of the predicted rollover index is valid only for a short time of less than 1 second.

$$PRI(t_0) = RI(t_0) + \frac{d}{dt}RI(t_0)\Delta t \quad (5)$$

In other words, not only the rollover index of the external vehicle at the current time point (t), but also the rollover index predicted for a short time ($\Delta t$) may be calculated by using Equation (5).

$$\frac{d}{dt}RI(t_0)$$

means to calculate the rate of change in real time from the value calculated by Equation (4).

The processor 110 may calculate the rollover index by using the Equations (4) or equation (5).

Meanwhile, according to another embodiment of the disclosure, not only an external vehicle but also a rollover index of the vehicle 1000 may be calculated. For this operation, the processor 110 may obtain characteristic parameter values of the vehicle 1000 based on the type or model name of the vehicle 1000 previously stored in the memory 120.

In addition, the processor 110 may obtain a rate of change of the roll angle and the roll direction angle of the vehicle 1000 based on the image obtained through the camera 224. For example, the processor 110 may obtain a rate of change of the angle of the vehicle 1000 and the roll direction by inputting an image obtained through the camera 224 to the artificial intelligence model learned by the artificial intelligence algorithm.

The processor 110 may calculate the rollover index of the vehicle 1000 by applying the obtained characteristic parameter values, the roll angle, and the rate of change of the roll direction angle of the vehicle 1000 to Equation (4) or (5).

When the calculated rollover index is greater than a preset rollover index, the processor 110 may identify that the vehicle has a possibility of being rolled over.

Even if the currently calculated rollover index is less than the preset rollover index, the processor 110 may calculate a rollover index by monitoring external vehicles within a preset distance from the vehicle 1000 or external vehicles that are expected to be rolled over, that is, vehicles having an overall height greater than or equal to a preset height, vehicles on the road with a curvature higher than a preset curvature, and vehicles in a place of frequent accidents.

The processor 110 may perform a preset operation according to the calculated rollover index. The preset operation may include at least one of an operation of controlling the display 241 to display information for notifying danger, an operation of controlling the speaker 242 to output a danger notification sound, an operation of controlling the display 241 to display information on the established driving strategy by establishing a driving strategy of the vehicle 1000, and an operation of controlling the vehicle driver 230 according to the established driving strategy.

Specifically, when the calculated rollover index is greater than the preset rollover index, the processor 110 may provide a notification to the user.

For example, when the rollover index calculated for the external vehicle is greater than the preset rollover index, the processor 110 may control the outputter 240 to notify the user of the dangerous situation. According to an embodiment, the processor 110 may control the display 241 to display information notifying a dangerous situation. For example, as illustrated in FIG. 4, information informing of a dangerous situation may be displayed on the electronic apparatus 100. As another example, the processor 110 may control the speaker 242 to output a warning sound. As another example, the processor 110 may control the haptic module 243 to vibrate at least one of a steering wheel, a seat belt, and a seat of the vehicle 1000.

In addition, the processor 110 may control the outputter 240 to provide a notification even when the rollover index calculated for the vehicle 1000 is greater than the preset rollover index.

If it is identified that there is no preset user action within a preset time after providing the notification as described above, the processor 110 may control the vehicle 1000 to avoid the rollover index from an external vehicle greater than the preset rollover index. Here, the preset user action relates to an appropriate response to the corresponding risk. For example, when there is a risk in the side, the preset user action is to accelerate the vehicle 1000. If there is no such preset user action, the vehicle 1000 may be automatically controlled. For example, the processor 110 may control at least one of the steering control module 231 and the shift control module 232 such that the vehicle 1000 avoids the vehicle 1000 from an external vehicle having a rollover risk index greater than the preset rollover risk index.

In addition, the processor 110 may establish a driving strategy based on a vehicle in which the calculated rollover index is greater than the preset rollover index. Here, the driving strategy may include at least one of a speed change, a route change, and a lane change.

In this case, the processor 110 may establish a different driving strategy according to whether an external vehicle with a calculated rollover index greater than the preset rollover index is located in the front, rear, or side of the vehicle 1000.

According to an embodiment, when an external vehicle in which the calculated rollover index is greater than the preset rollover index is located in front of the vehicle 1000, the processor 110 may identify whether a dangerous situation can be prevented by decreasing speed within a maximum deceleration speed limit of the vehicle, and decelerate the speed and if it can be prevented, and establish a driving strategy to decelerate if not. In the case of the rollover index, since it is calculated as a value of −1 to +1, it is possible to identify in which direction the rollover will occur. Therefore, it is possible to establish a driving strategy to steer in the opposite direction of the expected rollover.

According to another embodiment, when an external vehicle whose calculated rollover risk index is greater than the preset rollover index is located on the side of the vehicle 1000, the processor 110 may identifies whether or not the vehicle can be avoided from the external vehicle within a preset threshold time within the acceleration within the maximum acceleration capability of the vehicle 1000, and accelerate if it can be avoided, and decelerate and establish a driving strategy that prepares a strategy for avoiding the danger ahead, if it cannot be avoided. According to another embodiment, when an external vehicle in which the calculated rollover risk index is greater than the preset rollover risk index is located at the rear of the vehicle 1000, the processor may identify whether the vehicle can be avoided from the external vehicle within a preset threshold time within the acceleration within the maximum acceleration capability of the vehicle 1000, and accelerate if it can be avoided, and steer and establish a driving strategy to steer if it cannot be avoided. In the case of the rollover index, since it is calculated as a value of −1 to +1, it is possible to identify in which direction the rollover will occur. Therefore, it is possible to establish a driving strategy to steer in the opposite direction of the expected rollover.

Meanwhile, even if the calculated rollover index is less than the preset rollover index, the vehicle in the rear may continuously track external vehicles that are expected to have the possibility of overturning, that is vehicles with an overall height greater than or equal to a preset height, vehicles on a road with a curvature higher than a preset curvature, and vehicles within a place of frequent accidents to calculate a rollover risk index.

Figure 7:
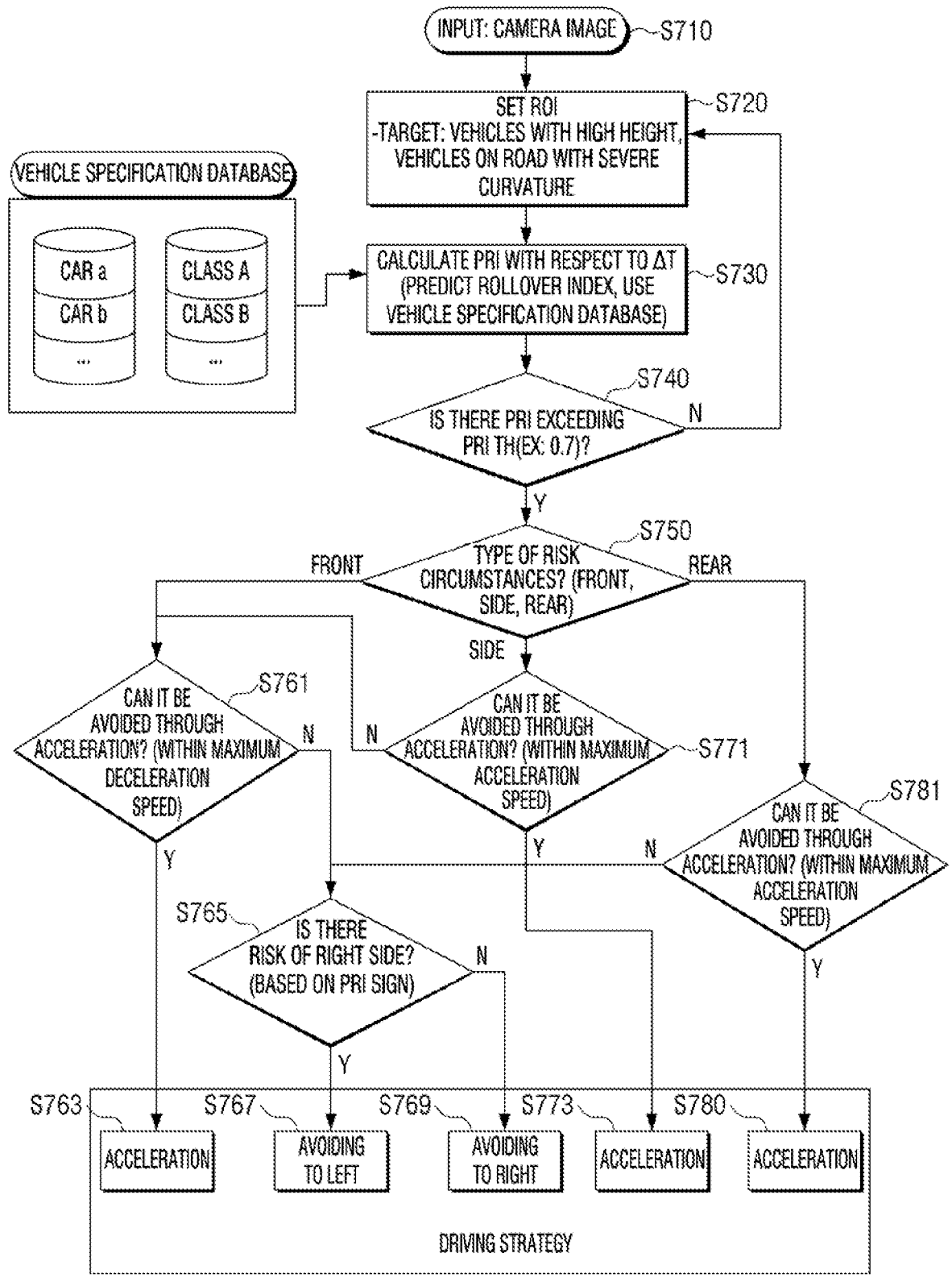
FIG. 7 is a flowchart illustrating a method for controlling an electronic apparatus according to an embodiment.

FIG. 7 is a flowchart illustrating a method of calculating a rollover index and establishing a driving strategy accordingly according to an embodiment of the disclosure.

Referring to FIG. 7, the electronic apparatus 100 receives an image obtained through the camera 224 (S710). In addition, the electronic apparatus 100 sets ROIs on specific objects in the image (S720). For example, the ROI may be set for vehicles with high height, vehicles on a road with severe curvature, and vehicles in a place of frequent accidents.

In addition, the electronic apparatus 100 may calculate a predicted rollover index (PRI) for vehicles in which the ROI is set (S730). In this case, the electronic apparatus 100 may identify the type or specific model of vehicles for which the ROI is set through an artificial intelligence model, and may obtain vehicle characteristic parameters (e.g., vehicle mass, roll damping coefficient, roll elasticity coefficient, and track) from a specification database for the identified vehicle type, vehicle class, or vehicle model. Such a specification database may be stored in the electronic apparatus 100 or may be stored in an external server. In the latter case, the electronic apparatus 100 may receive information on the characteristic parameter through the communicator 130.

In addition, the electronic apparatus 100 may identify whether there is a case of greater than the preset rollover risk index, for example, 0.7 among the calculated rollover risk indices (S740). If there is a case that is greater than the preset rollover index, the electronic apparatus may identify the type of the dangerous situation of the vehicle (S750).

When a dangerous situation is ahead, the electronic apparatus may identify whether it can be avoided through deceleration (S761), and if possible, control the shift control module 232 to decelerate (S763), and identify whether there is a right risk based on the calculated PRI sign (+ or −) if it is not possible (S765), and control the steering control module 231 to avoid to the left if there is a right risk (S767), and control the steering control module 231 so as to avoid it to the right if there is a risk on the left (S769).

When the dangerous situation is on the side, the electronic apparatus may identify whether it can be avoided through acceleration (S771), and if possible, control the shift control module 232 to accelerate (S773). If this is not possible, it may be proceeded by the operation of S761 as described above.

When a dangerous situation is in the rear, the electronic apparatus may identify whether it is possible to avoid through acceleration (S781), and if possible, the shift control module 232 may be controlled to accelerate (S783). If this is not possible, the process may proceed to the operation of S765 as described above.

When the driving strategy is established as described above, the processor 110 may control the vehicle driver 230 based on the established driving strategy. Specifically, the processor 110 may generate a control signal for decelerating or accelerating at a speed determined according to a driving strategy and transmit it to the shift control module 232. Alternatively, a control signal for switching to a direction determined according to a driving strategy may be generated and transmitted to the steering control module 231.

In another embodiment, the processor 110 may not directly control the vehicle driver 230, but transmit information on the established driving strategy to the vehicle driver 230, and the vehicle driver 230 may include a separate computing device, and control speed and/or steering control by interpreting the received information.

Figure 8:
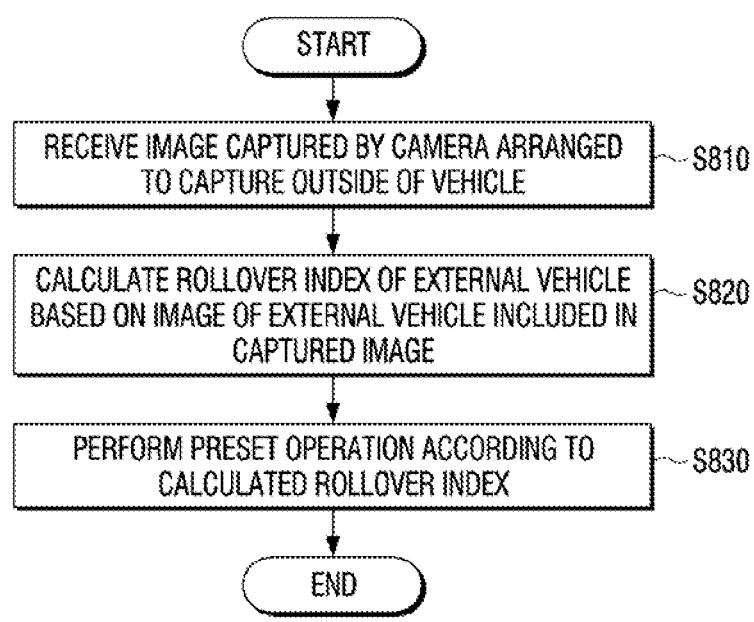
FIG. 8 is a flowchart illustrating a method for controlling an electronic apparatus according to another embodiment.

FIG. 8 is a flowchart illustrating a method for controlling an electronic apparatus according to an embodiment of the disclosure. The flowchart illustrated in FIG. 8 may include operations processed by the vehicle 1000 or the electronic apparatus 100 described herein. Accordingly, even if the contents are omitted below, the contents described with respect to the vehicle 1000 or the electronic apparatus 100 may also be applied to the flowchart illustrated in FIG. 8.

Referring to FIG. 8, the electronic apparatus may receive an image captured by a camera arranged to capture the outside of the vehicle (S810).

Further, the electronic apparatus calculates a rollover index of the external vehicle based on the image of the external vehicle included in the obtained image (S820).

It may be possible to calculate the rollover index for all external vehicles included in the obtained image, but it may be possible to calculate the rollover index for only selected parts. Alternatively, the rollover index may be calculated for all external vehicles, but a priority of which vehicle to calculate the rollover index may be determined.

The electronic apparatus may preferentially calculate the rollover index of an external vehicle that is predicted to have a rollover risk. External vehicles that are predicted to be at risk of overturning may include vehicles with high overall heights, vehicles on highly curved roads, and vehicles in place of frequent accidents.

According to an embodiment, when a plurality of external vehicles are included in the obtained image, the electronic apparatus may identify an external vehicle whose total height is greater than or equal to a preset height among the plurality of external vehicles, and preferentially calculate the rollover index of the identified external vehicle.

In this case, the electronic apparatus may obtain information on the types of the plurality of external vehicles by inputting the images of the plurality of external vehicles to the artificial intelligence model learned by the artificial intelligence algorithm, and may identify an external vehicle having an overall height greater than or equal to the preset height among a plurality of external vehicles based on the obtained information.

For example, referring to FIG. 6, the electronic apparatus may obtain information on the type of each vehicle by inputting images of the plurality of external vehicles in which ROIs are set (images in a rectangular area) into the artificial intelligence model.

According to another embodiment, when a plurality of external vehicles are included in the obtained image, the electronic apparatus may identify an external vehicle on a road having a curvature greater than a preset curvature among the plurality of external vehicles, and preferentially calculate the rollover index.

In this case, the electronic apparatus may obtain map information of a location where the vehicle is currently located, and identify an external vehicle on a road having a curvature greater than a preset curvature among the plurality of external vehicles based on the obtained map information.

As a method of calculating the rollover risk index, for example, a roll angle of the external vehicle is obtained by inputting an image of an external vehicle into an artificial intelligence model learned by an artificial intelligence algorithm, and the rollover index of the external vehicle may be calculated based on the obtained roll angle.

As another example, the electronic apparatus may obtain a plurality of characteristic parameters with respect to the external vehicle based on information on the type of the external vehicle obtained using the artificial intelligence model, and calculate the rollover index of the external vehicle based on the plurality of characteristic parameters. For example, the electronic apparatus may obtain a characteristic parameter from a database (external database or a database stored in the memory 120) storing information on the specifications of the vehicle for each vehicle type or for each vehicle model. The plurality of characteristic parameters for the external vehicle may include a mass of the external vehicle, a roll damping coefficient, a roll elastic coefficient, and a vehicle track. When it is desired to calculate the rollover index of the user's vehicle, the electronic apparatus may obtain the characteristic parameter of the host vehicle from the database.

In addition, the electronic apparatus may perform a preset operation according to the calculated rollover index (S830).

According to an embodiment, when the calculated rollover index is greater than a preset rollover index, the electronic apparatus may provide a notification to the user. For example, referring to FIG. 4, such a notification may be provided through a display of the electronic apparatus 100 implemented as a smartphone.

In addition to notification of the risk of rollover, the electronic apparatus may perform operations such as a warning to avoid a collision while changing lanes, a warning when there is a possibility of a collision at an intersection on the road, a warning to stop driving according to the surrounding circumstances, a notification of possible collisions with other vehicles at intersections when turning left/right, a warning to maintain a safe distance from vehicles in front to avoid rear collisions, and a transmission of braking information to surrounding vehicles in case of emergency braking.

In addition, when it is identified that there is no preset user action within a preset time after providing the notification as described above, the electronic apparatus may control the vehicle to avoid it from an external vehicle. Here, the preset user action is related to an appropriate response to the current dangerous situation. For example, when there is a risk of an external vehicle being overturned in front of the vehicle, when the user deaccelerates the vehicle after a notification is provided, the electronic apparatus may identify that there is a preset user action. However, if there is no such user action, the vehicle may be controlled to automatically decelerate.

Figure 9:
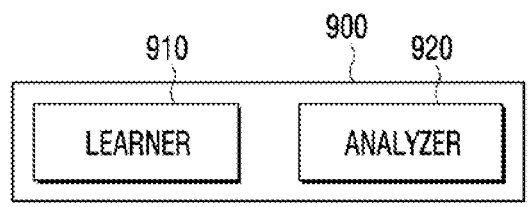
FIG. 9 is a view illustrating an artificial intelligence module according to an embodiment.

FIG. 9 is a view illustrating an artificial intelligence module 900 according to an embodiment of the disclosure that may be included in the electronic apparatus 100, the vehicle 1000, or an external server (not shown). The artificial intelligence module 900 may be included in the memory 120 and may be executed by the processor 110. In addition, the artificial intelligence module 900 may be included in a memory of an external server and executed by a processor of the server.

The artificial intelligence module 900 may include a learning unit 910 and an analyzer 920.

The learning unit 910 may generate or train an artificial intelligence model by using the learning data.

For example, the learning unit 910 may generate a model trained to have a criterion for identifying the type and class of the vehicle (e.g., sedan, SUV, bus, etc.) from an image obtained by capturing a vehicle with a camera. Even a specific model of the vehicle may be identified by training to identify a specific vehicle. As another example, the learning unit 910 may generate a model learned to have a criterion for identifying a roll angle and a rate of change in a roll direction angle of a corresponding vehicle from an image obtained by capturing a vehicle. As another example, the learning unit 910 may generate a model trained to have a criterion for determining a rate of change of a roll angle and a roll direction angle of the vehicle based on an image obtained through a camera arranged to capture the exterior of the vehicle.

The models thus trained may be, for example, models based on a neural network. An object recognition model may be designed to simulate a human brain structure on a computer and may include a plurality of network nodes with weights, which simulate neurons of a human neural network. A plurality of network nodes may each form a connection relationship so as to simulate the synaptic activity of neurons that transmit and receive signals through synapses. In addition, the learned models may include, for example, a neural network model or a deep learning model developed from a neural network model. A plurality of network nodes in deep learning models, may transmit and receive data in accordance with the (convolution) connected relationship while located at different depths (or layers) convolution. For example, models such as deep neural network (DNN), recurrent neural network (RNN) and bidirectional recurrent deep neural network (BRDNN) may be used as a data recognition model, but is not limited thereto.

The analyzer 920 may obtain result data by inputting data into the learned model.

As an example, the analyzer 920 may input the image obtained through the camera 224 into the learned model, and obtain data as a result of identifying the type of vehicle in the image. As another example, the analyzer 920 may input the image obtained through the camera 224 into the learned model to obtain information on the roll angle and the change rate of the roll direction angle of the vehicle in the image. As another example, the analyzer 920 may input the image obtained through the camera module 224 into the learned model to obtain information on the roll angle and the change rate of the roll direction angle of the vehicle 1000.

At least a portion of the learning unit 910 and at least a portion of the analyzer 920 may be implemented as a software module or manufactured in the form of at least one hardware chip and mounted on an electronic apparatus. For example, at least one of the learning unit 910 and the analyzer 920 may be manufactured in the form of a dedicated hardware chip for artificial intelligence (AI), or may be manufactured as a part of an existing general-purpose processor (e.g., CPU or application processor) or a graphics dedicated processor (e.g., GPU), and mounted on a server providing the aforementioned electronic apparatus 100, the vehicle 1000, or the artificial intelligence model to the electronic apparatus 100 or the vehicle 1000. In this operation, the dedicated hardware chip for artificial intelligence is a dedicated processor specialized in probability calculation, and has higher parallel processing performance than the existing general-purpose processors, so it may quickly process calculation tasks in the field of artificial intelligence such as machine learning. When the learning unit 910 and analyzer 920 are implemented as a software module (or program module including instructions), it may be stored in a computer-readable non-temporarily-readable recording media. In this case, the software module may be provided by an operating system (OS) or may be provided by a predetermined application. Alternatively, some of the software modules may be provided by an operating system (OS), and some of the software modules may be provided by a predetermined application.

The learning unit 910 and the analyzer 920 may be mounted on one electronic apparatus, or may be mounted on separate electronic apparatuses, respectively. For example, one of the learning unit 910 and the analyzer 920 may be included in the electronic apparatus 100 and the other may be included in an external server. In addition, the learning unit 910 and the analyzer 920 may provide model information established by the learning unit 910 to the analyzer 920 through wired or wireless, or may be provided to the learning unit 910 as additional learning data input to the learning unit 910.

Figure 10:
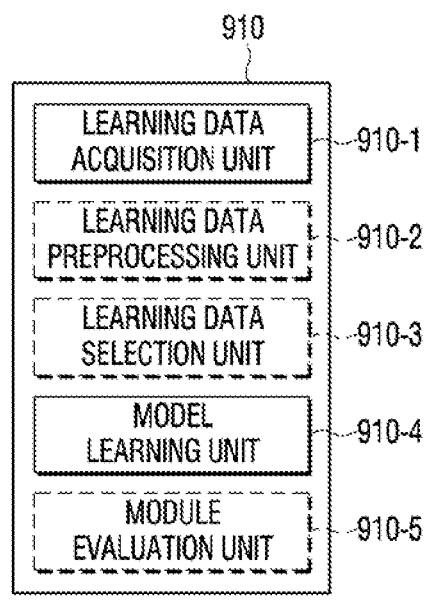
FIG. 10 is a block diagram illustrating a learning unit according to an embodiment.

FIG. 10 is a block diagram of a learning unit 910 according to an embodiment.

Referring to FIG. 10, the learning unit 910 according to some embodiments may include a learning data acquisition unit 910-1 and a model learning unit 910-4. In addition, the learning unit 910 may optionally further include at least one of a learning data preprocessing unit 910-2, a learning data selection unit 910-3, and a model evaluation unit 910-5.

As described above, the learning data acquisition unit 910-1 may acquire learning data to train a model for recognizing vehicles, identifying a roll angle of the vehicles, and a rate of change in the roll direction angle from the image.

The learning data may be data collected and tested by the learning unit 910 or a manufacturer of the learning unit 910.

The model learning unit 910-4 may learn to have a criterion for how the model understands, identifies, recognizes, determines, and infers the input data by using the learning data. For example, the model learning unit 910-4 may learn a data recognition model through supervised learning using learning data as an input value. As another example, the model learning unit 910-4 may learn a data recognition model through unsupervised learning which finds criteria for determining circumstances by learning the type of data for determining circumstances without further guidance. As another example, the model learning unit 910-4 may learn a data recognition model through reinforcement learning which uses feedback on whether the result of the circumstances determination according to learning is correct. In addition, the model learning unit 910-4, for example, may learn a data recognition model using a learning algorithm including an error back-propagation method or a gradient descent method, etc.

According to one or more exemplary embodiments, if there are a plurality of pre-established data recognition models, the model learning unit 910-4 may determine a data recognition model with high relevancy between input learning data and basic learning data as a data recognition model to learn. In this case, the basic learning data may be pre-classified according to the type of data, and the data recognition model may be pre-established according to the type of data. For example, the basic learning data may be pre-classified by various criteria such as an area where the learning data is generated, a time at which the learning data is generated, a size of the learning data, a genre of the learning data, a creator of the learning data, a type of object in the learning data, etc.

Further, when the data recognition model is learned, the model learning unit 910-4 may store the learned data recognition model. For example, the model learning unit 910-4 may store the learned model in the memory 120 or a memory of an external server.

The learning unit 910 may further include the pre-processor 910-2 and the learning data selection unit 910-3 in order to improve a processing capability of the model, or save resources or time required to generate the model.

The preprocessing unit 910-2 may pre-process obtained data so that the obtained data can be used for learning to determine circumstances. The learning data preprocessing unit 910-2 may process the obtained data into a preset format so that the model learning unit 910-4 can use the obtained data for learning to determine circumstances.

The learning data selection unit 910-3 may select data necessary for learning from data obtained by the learning data acquisition unit 910-1 or data preprocessed by the learning data preprocessing unit 910-2. The selected learning data may be provided to the model learning unit 910-4. The learning data selection unit 910-3 may select learning data necessary for learning from obtained or preprocessed data according to a preset selection criterion. In addition, the learning data selection unit 910-3 may select data according to predetermined criteria by learning of the model learning unit 910-4 which will be described below.

The learning unit 910 may further include a model evaluation unit 910-5 in order to improve the processing capability of the model.

The model evaluation unit 910-5 may input evaluation data to a data recognition model, and if the recognition result output from the evaluation data does not satisfy predetermined criteria, allow the model learning unit 910-4 to learn again. In this case, the evaluation data may be predefined data for evaluating the model.

For example, if the number or the ratio of the evaluation data whose recognition result is not accurate among the recognition results of the learned data recognition model for the evaluation data exceeds a predetermined threshold value, the model evaluation unit 910-5 may evaluate that predetermined criteria are not satisfied.

Meanwhile, when there are a plurality of learned data recognition models, the model evaluation unit 910-5 may evaluate whether each of the learned moving image recognition models satisfies the predetermined criteria and determine the model which satisfies the predetermined criteria as the final data recognition model. In this case, when there are a plurality of models satisfying the predetermined criteria, the model evaluating unit 910-5 may determine any one or a predetermined number of models previously set in descending order of the evaluation score as the final data recognition model.

Figure 11:
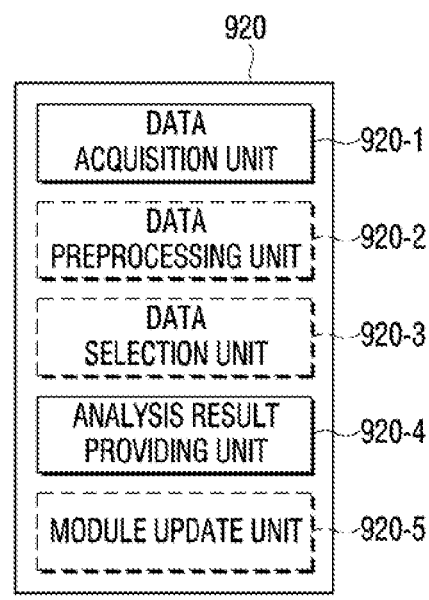
FIG. 11 is a block diagram illustrating an analyzer according to an embodiment.

FIG. 11 is a block diagram of an analysis unit 920 according to an embodiment.

Referring to FIG. 11, the analysis unit 920 may include a data acquisition unit 920-1 and an analysis result providing unit 920-4. In addition, the analysis unit 920 may optionally further include at least one of a data preprocessing unit 920-2, a data selection unit 920-3, and a model update unit 920-5.

The data acquisition unit 920-1 may acquire data necessary for analysis. The analysis result providing unit 920-4 may provide a result of inputting the data obtained by the data obtaining unit 920-1 into the learned model. The recognition result providing unit 920-4 may provide the recognition result according to the data recognition purpose. The analysis result providing unit 920-4 may obtain an analysis result by applying data selected by the data preprocessing unit 920-2 or the data selection unit 920-3 to be described later to the recognition model as input values. In addition, the recognition result may be determined by the data recognition model.

The analyzer 920 may further the pre-processing section unit 920-2 and a data selection unit 920-3 to improve the results of the model, or save resources or time for providing the result of analysis.

The preprocessing unit 920-2 may pre-process obtained data so that the obtained data can be used for learning to determine circumstances. The preprocessing unit 920-2 may process the obtained data into a predetermined format so that the recognition result providing unit 920-4, which will be described later, can utilize the data obtained to determine circumstances.

The data selection unit 920-3 may select data necessary for determining circumstances from the data obtained from the data acquisition unit or data preprocessed from the data preprocessing unit 920-2. The selected data may be provided to the analysis result providing unit 920-4. The data selection unit 920-3 may select some or all of the obtained or preprocessed data according to a preset selection criterion for determining circumstances. In addition, the recognition data selection unit 920-3 may select data according to the criteria predetermined by learning of the model learning unit 910-4 which will be described later.

The model update unit 920-5 may control the model to be updated based on the evaluation of the analysis result provided by the analysis result providing unit 920-4. For example, the model update unit 920-5 may provide the analysis result provided by the analysis result providing unit 920-4 to the model learning unit 910-4, so that the model learning unit 910-4 can request to further learn or update the model.

According to the embodiments described above, since the risk of overturning of the user's vehicle or other vehicles can be determined by using the image obtained through the camera, the system may be established at a relatively low cost without having an expensive sensor, and its installation and application is easy. Furthermore, a more advanced rollover risk warning and prevention system may be established by accurately calculating the rollover index and predicting after a short time.

Various embodiments described above may be implemented in software, hardware, or a combination thereof. According to the hardware embodiment, exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In particular, various embodiments described above may be implemented by the processor. In a software configuration, various embodiments described in the specification such as a procedure and a function may be embodied as separate software modules. The software modules may respectively perform one or more functions and operations described in the present specification.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions.

When such an instruction is executed by a processor, the processor may perform a function corresponding to the instruction directly or by using other components under the control of the processor. The instruction may include code generated or executed by a compiler or interpreter. For example, the above-described control method of the electronic apparatus may be executed by executing instructions stored in the storage medium by the processor. For example, receiving an image obtained through a camera arranged to capture the outside of the vehicle by executing an instruction stored in the storage medium by the processor of the device (or electronic apparatus), a method of controlling an electronic apparatus including calculating a rollover index of the external vehicle based on the image of the external vehicle included in the obtained image, and performing a predetermined operation according to the calculated rollover index may be performed.

The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various exemplary embodiments, may be sequential, parallel, or both, executed iteratively or heuristically, or at least some operations may be performed in a different order, omitted, or other operations may be added.

The foregoing exemplary embodiments and advantages are merely exemplary and are not to be construed as limiting the present disclosure. The present teaching may be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An electronic apparatus for detecting risk factors around a vehicle, the apparatus comprising:
   a communicator;
   a memory configured to store at least one computer-executable instruction; and
   a processor configured to execute the at least one computer-executable instruction,
   wherein the processor is configured to:
   receive, through the communicator, an image obtained from a camera disposed for capturing an outside of the vehicle,
   obtain map information of a current location of the vehicle, the map information including accident information regarding a frequency of accidents associated with the current location of the vehicle,
   based on the accident information regarding the frequency of accidents associated with the current location of the vehicle, obtain a roll angle of an external vehicle by inputting an image of the external vehicle included in the obtained image to a first artificial intelligence model learned by an artificial intelligence algorithm,
   calculate, based on the obtained roll angle, a rollover index of the external vehicle, and
   perform a preset operation according to the calculated rollover index, the preset operation including controlling a movement of the vehicle to avoid the external vehicle.

2. The apparatus of claim 1, wherein the processor is configured to, based on a plurality of external vehicles being included in the obtained image, identify an external vehicle whose total height is equal to or greater than a preset height among the plurality of external vehicles, and calculate a rollover risk index of the identified external vehicle.

3. The apparatus of claim 2, wherein the processor is configured to obtain information on a type of the plurality of external vehicles by inputting an image of the plurality of external vehicles to a second artificial intelligence model learned by an artificial intelligence algorithm, and identify the external vehicle whose total height is equal to or greater than the preset height among the plurality of external vehicles based on the obtained information.

4. The apparatus of claim 1, wherein the processor is configured to, based on a plurality of external vehicles being included in the obtained image, identify an external vehicle on a road having a curvature greater than a preset curvature among the plurality of external vehicles, and calculate a rollover index of the identified external vehicle.

5. The apparatus of claim 4, wherein the processor is configured to identify the road as a place of frequent accidents occurring based on the curvature of the road being greater than the preset curvature.

6. The apparatus of claim 1, wherein the processor is configured to obtain information on a type of the external vehicle by inputting the image of the external vehicle to a second artificial intelligence model learned by an artificial intelligence algorithm, obtain a plurality of characteristic parameters with respect to the external vehicle based on the information on the type of the external vehicle, and calculate the rollover index of the external vehicle based on the plurality of characteristic parameters.

7. The apparatus of claim 6, wherein the plurality of characteristic parameters with respect to the external vehicle are configured to include mass, roll damping coefficient, a spring coefficient, and track of the external vehicle.

8. The apparatus of claim 1, wherein the processor is configured to, based on the calculated rollover index being greater than a preset rollover index, provide a notification to a user.

9. The apparatus of claim 8, wherein the processor is configured to, based on no preset user action within a preset time after providing the notification being identified, control the movement of the vehicle to avoid from the external vehicle.

10. A method for controlling an electronic apparatus for detecting risk factors around a vehicle, the method comprising:

receiving an image obtained from a camera disposed for capture an outside of the vehicle;

obtaining map information of a current location of the vehicle, the map information including accident information regarding a frequency of accidents associated with the current location of the vehicle;

based on the accident information regarding the frequency of accidents associated with the current location of the vehicle, obtaining a roll angle of an external vehicle by inputting an image of the external vehicle included in the obtained image to a first artificial intelligence model learned by an artificial intelligence algorithm;

calculating, based on the obtained roll angle, a rollover index of the external vehicle; and performing a preset operation according to the calculated rollover index, the preset operation including controlling a movement of the vehicle to avoid the external vehicle.

11. The method of claim 10, wherein the calculating the rollover index comprising:

based on a plurality of external vehicles being included in the obtained image, identifying an external vehicle whose total height is equal to or greater than a preset height among the plurality of external vehicles; and calculating a rollover risk index of the identified external vehicle.

12. The method of claim 11, wherein the identifying comprises obtaining information on a type of the plurality of external vehicles by inputting an image of the plurality of external vehicles to a second artificial intelligence model learned by an artificial intelligence algorithm, and identifying the external vehicle whose total height is equal to or greater than the preset height among the plurality of external vehicles based on the obtained information.

13. The method of claim 10, wherein the calculating the rollover index comprises:

based on a plurality of external vehicles being included in the obtained image, identifying an external vehicle on a road having a curvature greater than a preset curvature among the plurality of external vehicles; and calculating a rollover index of the identified external vehicle.

14. The method of claim 13, wherein the identifying comprises identifying the road as a place of frequent accidents occurring based on the curvature of the road being greater than the preset curvature.

15. The method of claim 10, further comprising:

obtaining information on a type of the external vehicle by inputting the image of the external vehicle to a second artificial intelligence model learned by an artificial intelligence algorithm;

obtaining a plurality of characteristic parameters with respect to the external vehicle based on the information on the type of the external vehicle; and calculating the rollover index of the external vehicle based on the plurality of characteristic parameters.

16. The method of claim 15, wherein the plurality of characteristic parameters with respect to the external vehicle are configured to include mass, roll damping coefficient, a spring coefficient, and track of the external vehicle.

17. The method of claim 10, further comprising, based on the calculated rollover index being greater than a preset rollover index, providing a notification to a user.

18. A non-transitory computer readable medium having instructions stored therein, which when executed by a processor in an electronic apparatus for detecting risk factors around a vehicle, cause the processor to execute a method comprising:

receiving an image obtained from a camera disposed for capture an outside of the vehicle;

obtaining map information of a current location of the vehicle, the map information including accident information regarding a frequency of accidents associated with the current location of the vehicle;

based on the accident information regarding the frequency of accidents associated with the current location of the vehicle, obtaining a roll angle of an external vehicle by inputting an image of the external vehicle included in the obtained image to a first artificial intelligence model learned by an artificial intelligence algorithm;

calculating, based on the obtained roll angle, a rollover index of the external vehicle; and performing a preset operation according to the calculated rollover index, the preset operation including controlling a movement of the vehicle to avoid the external vehicle.

* * * * *